(12) United States Patent
Tamaki et al.

(10) Patent No.: US 8,625,063 B2
(45) Date of Patent: Jan. 7, 2014

(54) DISPLAY AND ELECTRONIC UNIT HAVING PARTICULAR OPTICAL LAMINATE

(75) Inventors: Masaya Tamaki, Kanagawa (JP); Kazuyuki Maeda, Aichi (JP); Masaaki Kabe, Kanagawa (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 130 days.

(21) Appl. No.: 13/408,595

(22) Filed: Feb. 29, 2012

(65) Prior Publication Data

US 2012/0249931 A1  Oct. 4, 2012

(30) Foreign Application Priority Data

Mar. 29, 2011  (JP) .................................. 2011-072217

(51) Int. Cl.
*G02F 1/1335* (2006.01)

(52) U.S. Cl.
USPC ............. 349/117; 349/118; 349/96; 349/112; 349/114

(58) Field of Classification Search
USPC ............................ 349/117, 118, 96, 112, 114
See application file for complete search history.

(56) References Cited

U.S. PATENT DOCUMENTS

| 6,577,364 B1 * | 6/2003 | Tillin et al. ................... 349/119 |
| 2003/0107807 A1 * | 6/2003 | Saiki et al. ..................... 359/485 |
| 2007/0188686 A1 * | 8/2007 | Yano et al. ..................... 349/119 |

FOREIGN PATENT DOCUMENTS

| JP | 2771392 | 7/1998 |
| JP | 11-237623 | 8/1999 |

* cited by examiner

*Primary Examiner* — Mike Qi
(74) *Attorney, Agent, or Firm* — K&L Gates LLP

(57) ABSTRACT

A display capable of obtaining high contrast and an electronic unit including the display are provided. The display includes: a liquid crystal display panel including a liquid crystal layer and a light reflective layer; and an optical laminate disposed on the liquid crystal display panel, in which the optical laminate includes a first retardation layer, a light diffuser layer, a second retardation layer, and a polarization layer in order from a side closer to the liquid crystal display panel, the first retardation layer is a negative C-plate, and the second retardation layer is a λ/4 plate or a combination of a λ/4 plate and a λ/2 plate arranged in order from a side closer to the liquid crystal display panel.

16 Claims, 3 Drawing Sheets

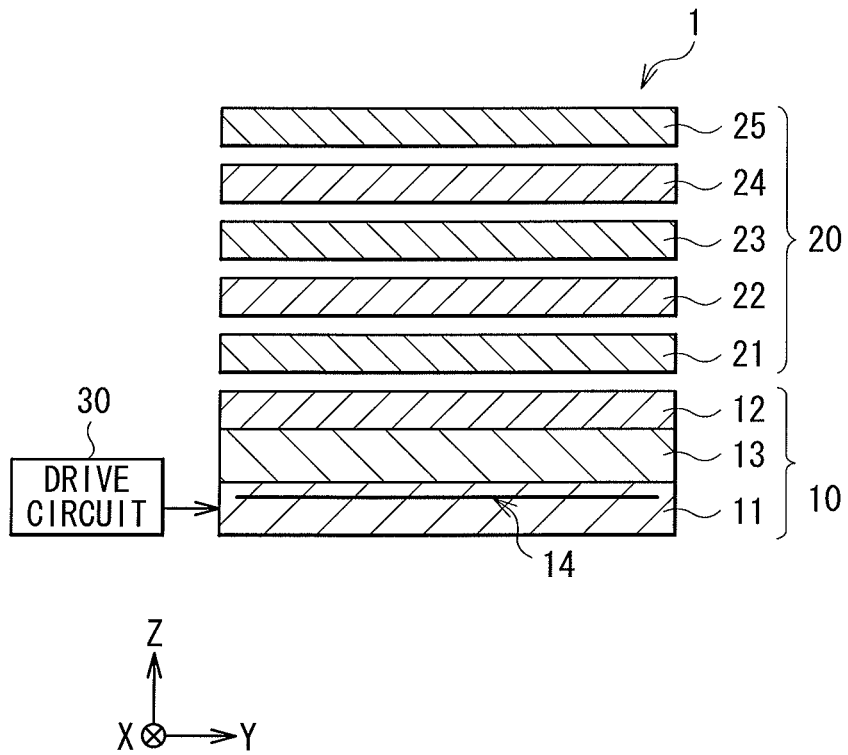
FIG. 1
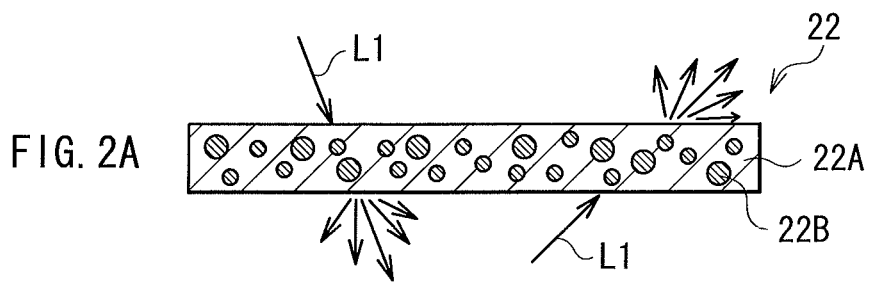
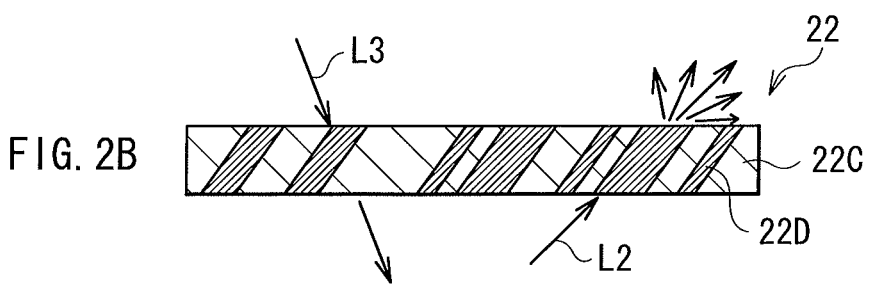
FIG. 2A
FIG. 2B

DISPLAY AND ELECTRONIC UNIT HAVING PARTICULAR OPTICAL LAMINATE

CROSS REFERENCES TO RELATED APPLICATIONS

The present application claims priority to Japanese Priority Patent Application JP 2011-072217 filed in the Japan Patent Office on Mar. 29, 2011, the entire content of which is hereby incorporated by reference.

BACKGROUND

The present application relates to a display including a reflective display panel or a semi-transmissive display panel having both a reflection section and a transmission section. Moreover, the present application relates to an electronic unit including the above-described display.

In recent years, displays for mobile units such as cellular phones and electronic papers have been in increasing demand, and attention has been given to reflective displays. The reflective displays perform display by reflecting externally incident light (ambient light) by a reflective plate, and do not need a backlight. Therefore, power consumption is reduced by power for the backlight; therefore, a mobile unit using the reflective display is allowed to be driven for a longer time than a mobile unit using a transmissive display. Moreover, as the backlight is not necessary, the weight and size of the display are allowed to be reduced accordingly.

In the reflective display, to perform display with use of external light, it is necessary to include a layer having a scattering function in the display. For example, in Japanese Patent No. 2771392, there is disclosed a method of providing a scattering function to a reflective electrode by forming projections and recessions on the reflective electrode. Moreover, in Japanese Unexamined Patent Application Publication No. H11-237623, there is disclosed a method of providing a front scattering film having more front scattering characteristics and less back scattering characteristics to a top surface of a glass substrate, instead of providing projections and recessions on the reflective electrode.

SUMMARY

In the method described in Japanese Patent No. 2771392, a process of forming projections and recessions on the reflective electrode is added to cause an increase in cost. The method described in Japanese Unexamined Patent Application Publication No. H11-237623 has an advantage over the method described in Japanese Patent No. 2771392 in that the number of processes is allowed to be reduced, compared to the case where projections and recessions are formed on the reflective electrode. However, in the method described in Japanese Unexamined Patent Application Publication No. H11-237623, a scattering angle range includes all directions; therefore, sufficient brightness in white display is not obtained to cause a low contrast ratio.

It is desirable to provide a display capable of obtaining high contrast, and an electronic unit including the display.

According to an embodiment, there is provided a first display including: a liquid crystal display panel including a liquid crystal layer and a light reflective layer; and an optical laminate disposed on the liquid crystal display panel. The optical laminate includes a first retardation layer, a light diffuser layer, a second retardation layer, and a polarization layer in order from a side closer to the liquid crystal display panel. The first retardation layer is a negative C-plate. The second retardation layer is a $\lambda/4$ plate or a combination of a $\lambda/4$ plate and a $\lambda/2$ plate arranged in order from a side closer to the liquid crystal display panel.

According to an embodiment, there is provided a first electronic unit including a display, the display including: a liquid crystal display panel including a liquid crystal layer and a light reflective layer; and an optical laminate disposed on the liquid crystal display panel, in which the optical laminate includes a first retardation layer, a light diffuser layer, a second retardation layer, and a polarization layer in order from a side closer to the liquid crystal display panel, the first retardation layer is a negative C-plate, and the second retardation layer is a $\lambda/4$ plate or a combination of a $\lambda/4$ plate and a $\lambda/2$ plate arranged in order from a side closer to the liquid crystal display panel.

In the first display and the first electronic unit according to an embodiment, the negative C-plate is disposed between the light diffuser layer and the liquid crystal display panel. Therefore, when the retardation of the liquid crystal layer is shifted according to inclination of light incident to the liquid crystal layer, a phase difference of the negative C-plate is shifted to a direction compensating for the retardation shift. As a result, light leakage in black display is reduced.

According to an embodiment, there is provided a second display including: a liquid crystal display panel including a liquid crystal layer and a light reflective layer; and an optical laminate disposed on the liquid crystal display panel. The optical laminate includes a first retardation layer, a light diffuser layer, a second retardation layer, and a polarization layer in order from a side closer to the liquid crystal display panel. The first retardation layer is a biaxial $\lambda/4$ plate having an Nz coefficient larger than 1. The second retardation layer is a $\lambda/2$ plate.

According to an embodiment, there is provided a second electronic unit including a display, the display including: a liquid crystal display panel including a liquid crystal layer and a light reflective layer; and an optical laminate disposed on the liquid crystal display panel, in which the optical laminate includes a first retardation layer, a light diffuser layer, a second retardation layer, and a polarization layer in order from a side closer to the liquid crystal display panel, the first retardation layer is a biaxial $\lambda/4$ plate having an Nz coefficient larger than 1, and the second retardation layer is a $\lambda/2$ plate.

In the second display and the second electronic unit according to an embodiment, the biaxial $\lambda/4$ plate is disposed between the light diffuser layer and the liquid crystal display panel. Therefore, when the retardation of the liquid crystal layer is shifted according to inclination of light incident to the liquid crystal layer, the phase difference of the biaxial $\lambda/4$ plate is shifted to a direction compensating for the retardation shift. As a result, light leakage in black display is reduced.

According to an embodiment, there is provided a third display including: a liquid crystal display panel including a liquid crystal layer, a light reflective layer, and a first retardation layer; and an optical laminate disposed on the liquid crystal display panel. The optical laminate includes a light diffuser layer, a second retardation layer, and a polarization layer in order from a side closer to the liquid crystal display panel. The first retardation layer is a negative C-layer. The second retardation layer is a $\lambda/4$ plate or a combination of a $\lambda/4$ plate and a $\lambda/2$ plate arranged in order from a side closer to the liquid crystal display panel.

According to an embodiment, there is provided a third electronic unit including a display, the display including: a liquid crystal display panel including a liquid crystal layer, a light reflective layer, and a first retardation layer; and an optical laminate disposed on the liquid crystal display panel, in which the optical laminate includes a light diffuser layer, a second retardation layer, and a polarization layer in order from a side closer to the liquid crystal display panel, the first retardation layer is a negative C-layer, and the second retardation layer is a λ/4 plate or a combination of a λ/4 plate and a λ/2 plate arranged in order from a side closer to the liquid crystal display panel.

In the third display and the third electronic unit according to an embodiment, the negative C-layer is disposed in the liquid crystal display panel. Therefore, when the retardation of the liquid crystal layer is shifted according to inclination of light incident to the liquid crystal layer, the phase difference of the negative C-layer is shifted to a direction compensating for the retardation shift. As a result, light leakage in black display is reduced.

According to an embodiment, there is provided a fourth display including: a liquid crystal display panel including a liquid crystal layer, a light reflective layer, and a first retardation layer; and an optical laminate disposed on the liquid crystal display panel. The optical laminate includes a light diffuser layer, a second retardation layer, and a polarization layer in order from a side closer to the liquid crystal display panel. The first retardation layer is a biaxial λ/4 layer having an Nz coefficient larger than 1. The second retardation layer is a λ/2 plate.

According to an embodiment, there is provided a fourth electronic unit including a display, the display including: a liquid crystal display panel including a liquid crystal layer, a light reflective layer, and a first retardation layer; and an optical laminate disposed on the liquid crystal display panel, in which the optical laminate includes a light diffuser layer, a second retardation layer, and a polarization layer in order from a side closer to the liquid crystal display panel, the first retardation layer is a biaxial λ/4 layer having an Nz coefficient larger than 1, and the second retardation layer is a λ/2 plate.

In the fourth display and the fourth electronic unit according to an embodiment, the biaxial λ/4 layer is disposed in the liquid crystal display panel. Therefore, when the retardation of the liquid crystal layer is shifted according to inclination of light incident to the liquid crystal layer, the phase difference of the biaxial λ/4 layer is shifted to a direction compensating for the retardation shift. As a result, light leakage in black display is reduced.

In the first to fourth displays and the first to fourth electronic units according to an embodiment, light leakage in black display is reduced by a phase compensation function by the negative C-plate, the biaxial λ/4 plate, the negative C-layer, or the biaxial λ/4 layer; therefore, high contrast is allowed to be obtained.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIG. 1 is a sectional view illustrating an example of a configuration of a display according to an embodiment.

FIGS. 2A and 2B are sectional views of an example of a configuration of a light diffuser plate in FIG. 1.

DETAILED DESCRIPTION

Figure 3:
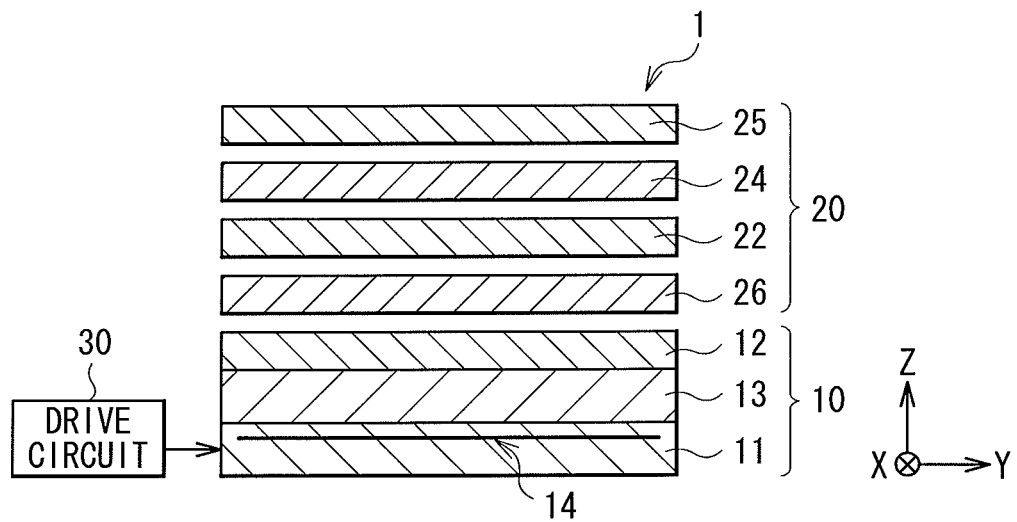
FIG. 3 is a sectional view illustrating a first modification of the display in FIG. 1.

The present application will be described in detail below referring to the accompanying drawings, according to an embodiment. It is to be noted that description will be given in the following order.
1. Embodiment (display)
An example in which a negative C-plate is disposed on a liquid crystal display panel
2. Modifications (display)
An example in which a biaxial λ/4 plate is disposed on a liquid crystal display panel
An example in which a negative C-layer is included in a liquid crystal display panel
An example in which a biaxial λ/4 layer is included in a liquid crystal display panel
3. Application Example (electronic unit)
An example in which the display according to any of the above-described embodiment and modifications thereof is used
1. Embodiment Configuration FIG. 1 illustrates an example of a sectional configuration of a display 1 according to an embodiment of the technology. It is to be noted that FIG. 1 is a schematic illustration, and dimensions and shapes in the illustration are not necessarily the same as actual dimensions and shapes. For example, as illustrated in FIG. 1, the display 1 includes a liquid crystal display panel 10, an optical laminate 20 disposed on the liquid crystal display panel 10, and a drive circuit 30 driving the liquid crystal display panel 10 in response to a picture signal.

In the display 1, a surface on a side farther from the liquid crystal display panel 10 of the optical laminate 20 is a picture display surface, and a light source such as a backlight is not disposed on a back side of the liquid crystal display panel 10. In other words, the liquid crystal display panel 10 is a reflective display panel displaying a picture by reflecting light incident from the picture display surface.
(Liquid Crystal Display Panel 10)

For example, as illustrated in FIG. 1, the liquid crystal display panel 10 includes a TFT (Thin Film Transistor) substrate 11 and an opposed substrate 12 which face each other with a predetermined gap in between, and a liquid crystal layer 13 disposed between the TFT substrate 11 and the opposed substrate 12.

The liquid crystal layer 13 is made of, for example, a nematic liquid crystal, and as will be described later, the liquid crystal layer 13 has a modulation function of allowing light incident to the liquid crystal layer 13 to pass therethrough or blocking the light from one pixel to another by a voltage applied from the drive circuit 30. It is to be noted that gradation of each pixel is adjusted by changing the light transmission level of the liquid crystal.

The TFT substrate 11 includes, for example, a plurality of pixel electrodes and pixel circuits provided to the pixel electrodes, respectively, on a substrate such as a glass substrate. The pixel circuits each include, for example, a TFT, a capacitive element, and the like. The TFT substrate 11 includes, for example, an alignment film. For example, as illustrated in FIG. 1, the TFT substrate 11 further includes a reflective layer 14 reflecting light incident from the liquid crystal layer 13. The opposed substrate 12 includes, for example, a common electrode on a surface on a side closer to the TFT substrate 11 of a substrate such as a glass substrate. The opposed substrate 12 includes, for example, an alignment film. The opposed substrate 12 further includes, for example, a color filter in a region facing the pixel electrode, and a light-shielding film in a region not facing the pixel electrode.

In this case, the substrate in the TFT substrate 11 may be made of a material other than the glass substrate, for example, a translucent resin substrate, quartz, or a silicon substrate. The substrate in the opposed substrate 12 may be made of a transparent material other than the glass substrate, for example, a translucent resin substrate, or quartz.

The plurality of pixel electrodes drive, together with the common electrode in the opposed substrate 12, the liquid crystal layer 13, and are two-dimensionally arranged in the TFT substrate 11. The common electrode is disposed to face the respective pixel electrodes. When a voltage is applied to the pixel electrodes and the common electrode by the drive circuit 30, an electrical field corresponding to a potential difference between the pixel electrodes and the common electrode is generated between the pixel electrodes and the common electrode, and the liquid crystal layer 13 is driven according to the magnitude of the electrical field. A portion corresponding to a portion where each pixel electrode and the common electrode face each other in the liquid crystal display panel 10 is a minimum unit where the liquid crystal layer is allowed to be partially driven by a voltage applied between the pixel electrode and the common electrode. This minimum unit corresponds to a pixel.

The reflective layer 14 may be configured of the pixel electrodes in the TFT substrate 11, or may be provided separately from the pixel electrodes. In the case where the reflective layer 14 is configured of the pixel electrodes, the pixel electrodes are made of a conductive material reflecting visible light, for example, a metal material such as Ag. In the case where the reflective layer 14 is provided separately from the pixel electrodes, the pixel electrodes may be made of a metal material as in the above-described case, or a conductive material transparent to visible light (for example, ITO (Indium Tin Oxide)). The common electrode is made of a conductive material transparent to visible light, for example, ITO.

The alignment films align liquid crystal molecules in the liquid crystal layer 13 in a predetermined direction, and are directly in contact with the liquid crystal layer 13. The alignment films are made of a polymer material such as polyimide, and are formed by performing a rubbing process on coated polyimide or the like. In the color filter, color filters separating light having passed through the liquid crystal layer 13 into, for example, three primary colors of red, green, and blue, respectively, are arranged corresponding to pixels, respectively. The light-shielding film has, for example, a function of absorbing visible light. The light-shielding film is formed between the pixels.

The liquid crystal display panel 10 is configured to allow long axes of liquid crystal molecules in the liquid crystal layer 13 to be aligned in a direction parallel or substantially parallel to a normal to the TFT substrate 11 in black display. The liquid crystal display panel 10 is configured of, for example, normally white ECB (electrical control birefringence) mode liquid crystal cells. It is to be noted that as long as liquid crystal molecules are aligned in the above-described manner in black display, the liquid crystal display panel 10 may be configured of liquid crystal cells of any other mode, for example, normally black VA (Vertical Alignment) mode liquid crystal cells.

(Optical Laminate 20)

For example, as illustrated in FIG. 1, the optical laminate 20 includes a negative C-plate 21, a light diffuser plate 22, a λ/4 plate 23, a λ/2 plate 24, and a polarizing plate 25 in order from a side closer to the liquid crystal display panel 10. The optical laminate 20 and the liquid crystal display panel 10 are bonded together with a sticking layer or an adhesive layer. Likewise, members adjacent to each other in the optical laminate 20 are bonded together with, for example, a sticking layer or an adhesive layer.

The negative C-plate 21 is an optical compensation film having a high birefringence developing property in a thickness direction, and an optical film exhibiting birefringence in the thickness direction but not exhibiting birefringence in an in-plane direction. This property is represented by the following expression.

$$nx=ny>nz$$

Herein, nx is a refractive index in one direction (an x-axis direction) in a plane of the negative C-plate 21. Moreover, ny is a refractive index in another direction (a y-axis direction orthogonal to an x axis) in the plane of the negative C-plate 21. Further, nz is a refractive index in a direction normal to the negative C-plate 21 (a z-axis direction).

A birefringence (Δn) in the thickness direction is represented by (nx+ny)/2−nz. A retardation Rth of the negative C-plate 21 is represented by Δn×d, where d is the thickness of the negative C-plate 21. The negative C-plate 21 optically compensates for retardation caused by the liquid crystal layer 13 with use of the retardation Rth thereof. For example, Rth preferably has a value around 100 nm at a wavelength of 550 nm and a wavelength close thereto.

The negative C-plate 21 is allowed to be formed by, for example, a casting method, a die coating method, a spray coating method, a spin coating method, a roll coating method, or an air knife coating method.

The light diffuser plate 22 is a front scattering plate having more front scattering characteristics and less back scattering characteristics. The light diffuser plate 22 is configured of one or a plurality of front scattering plates. For example, the light diffuser plate 22 is an isotropic front scattering plate scattering incident light in substantially the same scattering angle range even if light L1 enters the light diffuser plate 22 in any direction. For example, as illustrated in FIG. 2A, the light diffuser plate 22 is configured by adding, to a base 22A, a filler 22B with a different refractive index from the refractive index of the base 22A.

It is to be noted that, for example, the light diffuser plate 22 may be an anisotropic front scattering plate scattering only light L2 incident from a specific direction and allowing light L3 incident from a direction other than the specific direction to pass therethrough. In this case, for example, as illustrated in FIG. 2B, the light diffuser plate 22 is configured of first regions 22C and second regions 22D having different refractive indices from each other. The first regions 22C and the second regions 22D are configured to extend in a thickness direction and be inclined in a predetermined direction.

The λ/4 plate 23 is a uniaxially stretched film of a resin such as cycloolefin polymer or polycarbonate. The retardation of the λ/4 plate 23 is, for example, 0.14 μm, and is equivalent to approximately ¼ of the wavelength of green light having highest luminous efficiency in visible light. Therefore, the λ/4 plate 23 has a function of converting linearly polarized light incident from the polarizing plate 25 into circularly polarized light. The λ/2 plate 24 is, for example, a uniaxially stretched film of a polycarbonate resin. The retardation of the λ/2 plate 24 is, for example, 0.27 μm, and is equivalent to approximately ½ of the wavelength of green light having highest luminous efficiency in visible light. Herein, a combination of the λ/4 plate 23 and the λ/2 plate 24 has a function of converting linearly polarized light incident from the polarizing plate 25 into circularly polarized light, and functions as a (broadband) circular polarization plate for a wide-ranging wavelength as a whole.

The polarizing plate 25 has a function of absorbing a predetermined linearly polarized component, and allowing the other polarized component to pass therethrough. In other words, the polarizing plate 25 has a function of converting externally incident light into linearly polarized light. The polarizing plate 25 is configured by sandwiching, in TAC (triacetyl cellulose), a stretched polymer film of PVA (polyvinyl alcohol) with doping with a halogen material such as iodine or a dichroic dye.

Functions and Effects

Next, functions and effects of the display 1 according to the embodiment will be described below.

In the embodiment, for example, external light incident from a specific direction is converted into linearly polarized light by the polarizing plate 25, and further into counterclockwise circularly polarized light by the λ/2 plate 24 and the λ/4 plate 23, and then the counterclockwise circularly polarized light passes through the light diffuser plate 22 and the negative C-plate 21 to enter the liquid crystal display panel 10. The light incident to the liquid crystal display panel 10 is modulated by the liquid crystal layer 13 in response to a picture signal, and is reflected by the reflective layer 14 to pass through the negative C-plate 21 again, and then enter the light diffuser plate 22. The light incident to the light diffuser plate 22 is diffused by the light diffuser plate 22 in a predetermined angle range, and then the light is converted into linearly polarized light by the λ/2 plate 24 and the λ/4 plate 23 to exit through the polarizing plate 25.

In the embodiment, the negative C-plate 21 is disposed between the light diffuser plate 22 and the liquid crystal display panel 10. Therefore, light leakage in black display is reduced by a phase compensation function by the negative C-plate 21. As a result, high contrast is allowed to be obtained.

In the embodiment, to effectively implement phase compensation by the negative C-plate 21, it is only necessary that the liquid crystal display panel 10 is configured to allow the long axes of the liquid crystal molecules in the liquid crystal layer 13 to be aligned in the direction parallel or substantially parallel to the normal to the TFT substrate 11 in black display. In other words, phase compensation by the negative C-plate 21 is allowed to be effectively implemented in liquid crystal cells of various modes. Therefore, high contrast is allowed to be obtained in various modes.

2. Modifications

First Modification

For example, as illustrated in FIG. 3, the λ/4 plate 23 and the negative C-plate 21 in the above-described embodiment may not be included, and instead of them, a biaxial λ/4 plate 26 may be disposed in the position of the negative C-plate 21.

The biaxial λ/4 plate 26 is a λ/4 plate having an Nz coefficient larger than 1, for example, a biaxially stretched λ/4 plate. The biaxially stretched λ/4 plate is allowed to be formed by stretching, in one axial direction, a resin film without a phase difference to form a λ/4 plate, and then stretching the λ/4 plate in a direction different from the one axial direction. The biaxial λ/4 plate 26 has an optical compensation function similar to that of the negative C-plate 21.

In the modification, the biaxial λ/4 plate 26 is disposed between the light diffuser plate 22 and the liquid crystal display panel 10. Therefore, light leakage in black display is reduced by a phase compensation function by the biaxial λ/4 plate 26. As a result, high contrast is allowed to be obtained.

Moreover, in the modification, to effectively implement phase compensation by the biaxial λ/4 plate 26, it is only necessary that the liquid crystal display panel 10 is configured to allow long axes of liquid crystal molecules in the liquid crystal layer 13 to be aligned in a direction parallel or substantially parallel to the normal to the TFT substrate 11. In other words, phase compensation by the biaxial λ/4 plate 26 is allowed to be effectively implemented in liquid crystal cells of various modes. Therefore, high contrast is allowed to be obtained in various modes.

Second Modification

Figure 4:
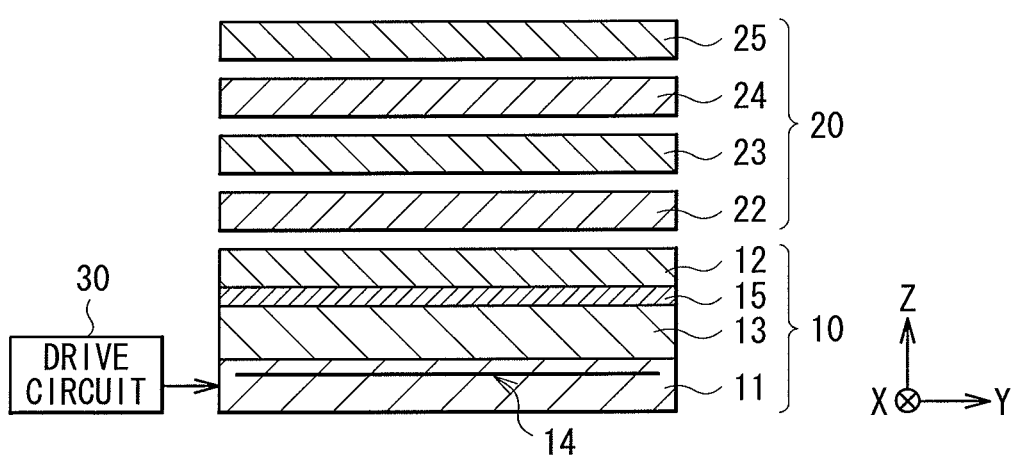
FIG. 4 is a sectional view illustrating a second modification of the display in FIG. 1.
Figure 5:
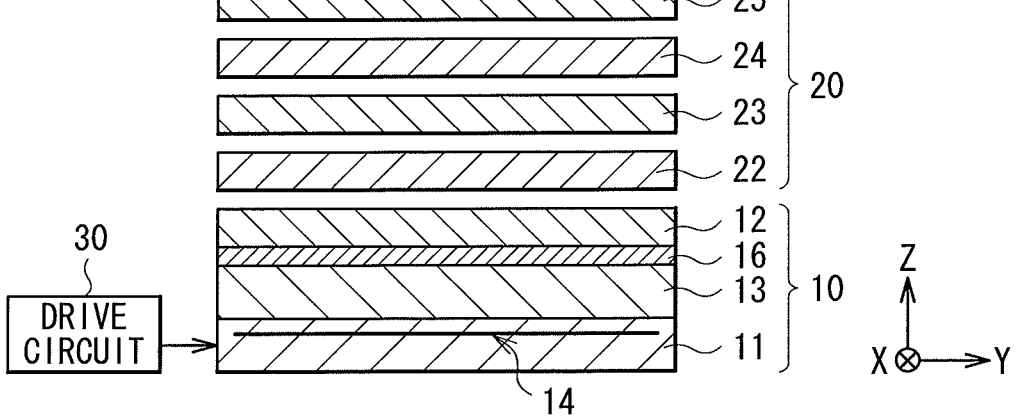
FIG. 5 is a sectional view illustrating a third modification of the display in FIG. 1.

The negative C-plate 21 in the above-described embodiment may not be included, and instead of the negative C-plate 21, a negative C-layer 15 may be included in the liquid crystal display panel 10. For example, as illustrated in FIG. 4, the negative C-layer 15 is formed below the opposed substrate 12. The negative C-layer 15 is an optical compensation layer having a high birefringence developing property in a thickness direction, and is an optical functional layer exhibiting birefringence in the thickness direction but not exhibiting birefringence in an in-plane direction. This property is represented by the following expression.

$$nx=ny>nz$$

Herein, nx is a refractive index in one direction (an x-axis direction) in a plane of the negative C-layer 15. Moreover, ny is a refractive index in another direction (a y-axis direction orthogonal to an x axis) in the plane of the negative C-layer 15. Further, nz is a refractive index in a direction normal to the negative C-layer 15 (a z-axis direction).

The negative C-layer 15 optically compensates for retardation caused by the liquid crystal layer 13 with use of retardation Rth thereof. For example, the retardation Rth of the negative C-layer 15 preferably has a value around 100 nm at a wavelength of 550 nm and a wavelength close thereto.

The negative C-layer 15 is allowed to be formed by, for example, a casting method, a die coating method, a spray coating method, a spin coating method, a roll coating method, or an air knife coating method.

In the modification, the negative C-layer 15 is disposed in the liquid crystal display panel 10. Therefore, irrespective of the mode of the liquid crystal layer 13, light leakage in black display is reduced by a phase compensation function by the negative C-layer 15. As a result, high contrast is allowed to be obtained.

Moreover, in the modification, to effectively implement phase compensation by the negative C-layer 15, it is only necessary that the liquid crystal display panel 10 is configured to allow long axes of liquid crystal molecules in the liquid crystal layer 13 to be aligned in a direction parallel or substantially parallel to the normal to the TFT substrate 11 in black display. In other words, a phase compensation function by the negative C-layer 15 is allowed to be effectively implemented in liquid crystal cells of various modes. Therefore, high contrast is allowed to be obtained in various modes.

Third Modification

The negative C-layer 15 in the second modification may not be included, and instead of the negative C-layer 15, a biaxial $\lambda/4$ layer 16 may be included in the liquid crystal display panel 10. The biaxial $\lambda/4$ layer 16 is a $\lambda/4$ layer having an Nz coefficient larger than 1, for example, a biaxially stretched $\lambda/4$ layer. The biaxially stretched $\lambda/4$ layer is allowed to be formed by stretching, in one axial direction, a resin film without a phase difference to form a $\lambda/4$ plate, and then stretching the $\lambda/4$ plate in a direction different from the one axial direction. The biaxial $\lambda/4$ layer 16 has an optical compensation function similar to that of the negative C-layer 15.

In the modification, the biaxial $\lambda/4$ layer 16 is disposed in the liquid crystal display panel 10. Therefore, light leakage in black display is reduced by a phase compensation function by the biaxial $\lambda/4$ layer 16. As a result, high contrast is allowed to be obtained.

Moreover, in the modification, to effectively implement phase compensation by the biaxial $\lambda/4$ layer 16, it is only necessary that the liquid crystal display panel 10 is configured to allow long axes of liquid crystal molecules in the liquid crystal layer 13 to be aligned in a direction parallel or substantially parallel to the normal to the TFT substrate 11. In other words, phase compensation by the biaxial $\lambda/4$ layer 16 is allowed to be effectively implemented in liquid crystal cells of various modes. Therefore, high contrast is allowed to be obtained in various modes.

Fourth Modification

In the above-described embodiment and the modifications thereof, in the case where the light diffuser plate 22 is an isotropic front scattering plate, the light diffuser plate 22 may be removed. However, in this case, a sticking layer having an isotropic front scattering function is preferably included between the negative C-plate 21, the biaxial $\lambda/4$ plate 26, the negative C-layer 15 or the biaxial $\lambda/4$ layer 16, and the polarizing plate 25. The above-described sticking layer is used to bond optical members together, and is made of, for example, a haze adhesive. Therefore, in an example of the display 1 illustrated in FIG. 1, an sticking layer having an isotropic front scattering function is disposed between the negative C-plate 21 and the $\lambda/4$ plate 23, between the $\lambda/4$ plate 23 and the $\lambda/2$ plate 24, or between the $\lambda/2$ plate 24 and the polarizing plate 25. Thus, in the case where the sticking layer is used instead of the light diffuser plate 22, the thickness of the display 1 is allowed to be reduced by the thickness of the light diffuser plate 22.

3. Application Example

Figure 6:
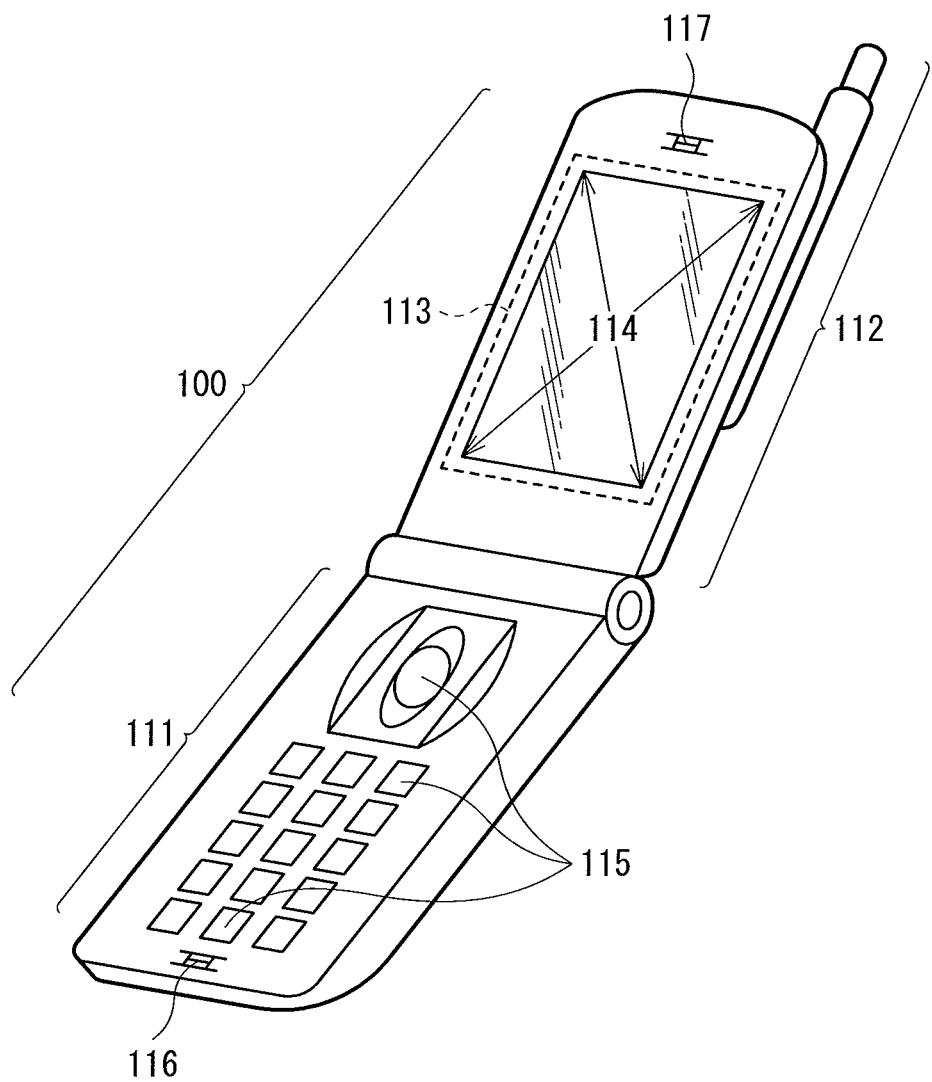
FIG. 6 is a perspective view illustrating an example of a configuration of an electronic unit according to an application example.

Next, an application example of the display 1 according to any of the above-described embodiment and modifications thereof will be described below. FIG. 6 is a schematic perspective view of an example of a configuration of an electronic unit 100 according to the application example. The electronic unit 100 is a cellular phone, and, for example, as illustrated in FIG. 6, the electronic unit 100 includes a main body 111, and a display section 112 openable and closable with respect to the main body 111. The main body 111 includes operation buttons 115 and a transmitter section 116. The display section 112 includes a display 113 and a receiver section 117. The display 113 displays various indications for telephone communication on a display screen 114 thereof. The electronic unit 100 includes a control section (not illustrated) to control the operation of the display 113. The control section is disposed in the main body 111 or the display section 112 as a part of a control section controlling the whole electronic unit 100 or a control section different from the control section controlling the whole electronic unit 100.

The display 113 has the same configuration as that of the display 1 according to any of the above-described embodiment and modifications thereof. Therefore, in the display 113, high contrast is allowed to be obtained.

It is to be noted that, in addition to the above-described cellular phone, electronic units to which the display 1 according to any of the above-described embodiment and modifications thereof is applicable include a personal computer, a liquid crystal television, a viewfinder type or monitor direct-view type videotape recorder, a car navigation system, a pager, an electronic organizer, an electronic calculator, a word processor, a work station, a videophone, a POS terminal, and the like.

Although the present technology is described referring to the embodiment, the modifications thereof, and the application examples, the technology is not limited thereto, and may be variously modified. For example, in the above-described embodiment and the like, the case where the technology is applied to the reflective liquid crystal display panel 10 is described as an example; however, the technology is applicable to a semi-transparent liquid crystal display panel. For example, the technology is applicable to a semi-transparent liquid crystal display panel having a configuration similar to the reflective liquid crystal display panel 10 as a reflection section, and including a transmission section with the reflection section.

It is to be noted that the technology is allowed to have the following configurations.

(1) A display including:
a liquid crystal display panel including a liquid crystal layer and a light reflective layer; and
an optical laminate disposed on the liquid crystal display panel,
in which the optical laminate includes a first retardation layer, a light diffuser layer, a second retardation layer, and a polarization layer in order from a side closer to the liquid crystal display panel,
the first retardation layer is a negative C-plate, and
the second retardation layer is a $\lambda/4$ plate or a combination of a $\lambda/4$ plate and a $\lambda/2$ plate arranged in order from a side closer to the liquid crystal display panel.

(2) A display including:
a liquid crystal display panel including a liquid crystal layer and a light reflective layer; and
an optical laminate disposed on the liquid crystal display panel,
in which the optical laminate includes a first retardation layer, a light diffuser layer, a second retardation layer, and a polarization layer in order from a side closer to the liquid crystal display panel,
the first retardation layer is a biaxial $\lambda/4$ plate having an Nz coefficient larger than 1, and
the second retardation layer is a $\lambda/2$ plate.

(3) A display including:
a liquid crystal display panel including a liquid crystal layer, a light reflective layer, and a first retardation layer; and
an optical laminate disposed on the liquid crystal display panel, in which the optical laminate includes a light diffuser layer, a second retardation layer, and a polarization layer in order from a side closer to the liquid crystal display panel, the first retardation layer is a negative C-layer, and the second retardation layer is a λ/4 plate or a combination of a λ/4 plate and a λ/2 plate arranged in order from a side closer to the liquid crystal display panel.

(4) A display including:

a liquid crystal display panel including a liquid crystal layer, a light reflective layer, and a first retardation layer; and an optical laminate disposed on the liquid crystal display panel, in which the optical laminate includes a light diffuser layer, a second retardation layer, and a polarization layer in order from a side closer to the liquid crystal display panel, the first retardation layer is a biaxial λ/4 layer having an Nz coefficient larger than 1, and the second retardation layer is a λ/2 plate.

(5) The display according to any one of (1) to (4), in which the liquid crystal display panel is configured to allow long axes of liquid crystal molecules in the liquid crystal layer to be aligned in a direction parallel or substantially parallel to a normal to the liquid crystal display panel in black display.

(6) An electronic unit including a display, the display including:

a liquid crystal display panel including a liquid crystal layer and a light reflective layer; and an optical laminate disposed on the liquid crystal display panel, in which the optical laminate includes a first retardation layer, a light diffuser layer, a second retardation layer, and a polarization layer in order from a side closer to the liquid crystal display panel, the first retardation layer is a negative C-plate, and the second retardation layer is a λ/4 plate or a combination of a λ/4 plate and a λ/2 plate arranged in order from a side closer to the liquid crystal display panel.

(7) An electronic unit including a display, the display including:

a liquid crystal display panel including a liquid crystal layer and a light reflective layer; and an optical laminate disposed on the liquid crystal display panel, in which the optical laminate includes a first retardation layer, a light diffuser layer, a second retardation layer, and a polarization layer in order from a side closer to the liquid crystal display panel, the first retardation layer is a biaxial λ/4 plate having an Nz coefficient larger than 1, and the second retardation layer is a λ/2 plate.

(8) An electronic unit including a display, the display including:

a liquid crystal display panel including a liquid crystal layer, a light reflective layer, and a first retardation layer; and an optical laminate disposed on the liquid crystal display panel, in which the optical laminate includes a light diffuser layer, a second retardation layer, and a polarization layer in order from a side closer to the liquid crystal display panel, the first retardation layer is a negative C-layer, and the second retardation layer is a λ/4 plate or a combination of a λ/4 plate and a λ/2 plate arranged in order from a side closer to the liquid crystal display panel.

(9) An electronic unit including a display, the display including:

a liquid crystal display panel including a liquid crystal layer, a light reflective layer, and a first retardation layer; and an optical laminate disposed on the liquid crystal display panel, in which the optical laminate includes a light diffuser layer, a second retardation layer, and a polarization layer in order from a side closer to the liquid crystal display panel, the first retardation layer is a biaxial λ/4 layer having an Nz coefficient larger than 1, and the second retardation layer is a λ/2 plate.

(10) The electronic unit according to any one of (6) to (9), in which the liquid crystal display panel is configured to allow long axes of liquid crystal molecules in the liquid crystal layer to be aligned in a direction parallel or substantially parallel to a normal to the liquid crystal display panel in black display.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display comprising:

a liquid crystal display panel including a liquid crystal layer and a light reflective layer; and an optical laminate disposed on the liquid crystal display panel, wherein the optical laminate includes a first retardation layer, a light diffuser layer, a second retardation layer, and a polarization layer in order from a side closer to the liquid crystal display panel, the first retardation layer is a negative C-plate, and the second retardation layer is a λ/4 plate or a combination of a λ/4 plate and a λ/2 plate arranged in order from a side closer to the liquid crystal display panel.

2. The display according to claim 1, wherein the liquid crystal display panel is configured to allow long axes of liquid crystal molecules in the liquid crystal layer to be aligned in a direction parallel or substantially parallel to a normal to the liquid crystal display panel in black display.

3. A display comprising:

a liquid crystal display panel including a liquid crystal layer and a light reflective layer; and an optical laminate disposed on the liquid crystal display panel, wherein the optical laminate includes a first retardation layer, a light diffuser layer, a second retardation layer, and a polarization layer in order from a side closer to the liquid crystal display panel, the first retardation layer is a biaxial λ/4 plate having an Nz coefficient larger than 1, and the second retardation layer is a λ/2 plate.

4. The display according to claim 3, wherein the liquid crystal display panel is configured to allow long axes of liquid crystal molecules in the liquid crystal layer to be aligned in a direction parallel or substantially parallel to a normal to the liquid crystal display panel in black display.

5. A display comprising:

a liquid crystal display panel including a liquid crystal layer, a light reflective layer, and a first retardation layer; and an optical laminate disposed on the liquid crystal display panel, wherein the optical laminate includes a light diffuser layer, a second retardation layer, and a polarization layer in order from a side closer to the liquid crystal display panel, the first retardation layer is a negative C-layer, and the second retardation layer is a λ/4 plate or a combination of a λ/4 plate and a λ/2 plate arranged in order from a side closer to the liquid crystal display panel.

6. The display according to claim 5, wherein the liquid crystal display panel is configured to allow long axes of liquid crystal molecules in the liquid crystal layer to be aligned in a direction parallel or substantially parallel to a normal to the liquid crystal display panel in black display.

7. A display comprising:

a liquid crystal display panel including a liquid crystal layer, a light reflective layer, and a first retardation layer; and an optical laminate disposed on the liquid crystal display panel, wherein the optical laminate includes a light diffuser layer, a second retardation layer, and a polarization layer in order from a side closer to the liquid crystal display panel, the first retardation layer is a biaxial λ/4 layer having an Nz coefficient larger than 1, and the second retardation layer is a λ/2 plate.

8. The display according to claim 7, wherein the liquid crystal display panel is configured to allow long axes of liquid crystal molecules in the liquid crystal layer to be aligned in a direction parallel or substantially parallel to a normal to the liquid crystal display panel in black display.

9. An electronic unit including a display, the display comprising:

a liquid crystal display panel including a liquid crystal layer and a light reflective layer; and an optical laminate disposed on the liquid crystal display panel, wherein the optical laminate includes a first retardation layer, a light diffuser layer, a second retardation layer, and a polarization layer in order from a side closer to the liquid crystal display panel, the first retardation layer is a negative C-plate, and the second retardation layer is a λ/4 plate or a combination of a λ/4 plate and a λ/2 plate arranged in order from a side closer to the liquid crystal display panel.

10. The electronic unit according to claim 9, wherein the liquid crystal display panel is configured to allow long axes of liquid crystal molecules in the liquid crystal layer to be aligned in a direction parallel or substantially parallel to a normal to the liquid crystal display panel in black display.

11. An electronic unit including a display, the display comprising:

a liquid crystal display panel including a liquid crystal layer and a light reflective layer; and an optical laminate disposed on the liquid crystal display panel, wherein the optical laminate includes a first retardation layer, a light diffuser layer, a second retardation layer, and a polarization layer in order from a side closer to the liquid crystal display panel, the first retardation layer is a biaxial λ/4 plate having an Nz coefficient larger than 1, and the second retardation layer is a λ/2 plate.

12. The electronic unit according to claim 11, wherein the liquid crystal display panel is configured to allow long axes of liquid crystal molecules in the liquid crystal layer to be aligned in a direction parallel or substantially parallel to a normal to the liquid crystal display panel in black display.

13. An electronic unit including a display, the display comprising:

a liquid crystal display panel including a liquid crystal layer, a light reflective layer, and a first retardation layer; and an optical laminate disposed on the liquid crystal display panel, wherein the optical laminate includes a light diffuser layer, a second retardation layer, and a polarization layer in order from a side closer to the liquid crystal display panel, the first retardation layer is a negative C-layer, and the second retardation layer is a λ/4 plate or a combination of a λ/4 plate and a λ/2 plate arranged in order from a side closer to the liquid crystal display panel.

14. The electronic unit according to claim 13, wherein the liquid crystal display panel is configured to allow long axes of liquid crystal molecules in the liquid crystal layer to be aligned in a direction parallel or substantially parallel to a normal to the liquid crystal display panel in black display.

15. An electronic unit including a display, the display comprising:

a liquid crystal display panel including a liquid crystal layer, a light reflective layer, and a first retardation layer; and an optical laminate disposed on the liquid crystal display panel, wherein the optical laminate includes a light diffuser layer, a second retardation layer, and a polarization layer in order from a side closer to the liquid crystal display panel, the first retardation layer is a biaxial λ/4 layer having an Nz coefficient larger than 1, and the second retardation layer is a λ/2 plate.

16. The electronic unit according to claim 15, wherein the liquid crystal display panel is configured to allow long axes of liquid crystal molecules in the liquid crystal layer to be aligned in a direction parallel or substantially parallel to a normal to the liquid crystal display panel in black display.

* * * * *